United States Patent [19]

Kase et al.

[11] Patent Number: 6,034,154
[45] Date of Patent: Mar. 7, 2000

[54] POLYMER FINE PARTICLES FOR JET INK, PROCESS FOR PRODUCING THE SAME, AND JET INK COMPRISING THE SAME

[75] Inventors: Mitsuo Kase, Chiba; Hidetoshi Konno, Mobara; Isao Tabayashi, Kuki; Ichiro Muramatsu, Ichihara, all of Japan

[73] Assignee: Dainippon Ink and Chemicals, Inc., Tokyo, Japan

[21] Appl. No.: 08/598,980

[22] Filed: Feb. 9, 1996

[30] Foreign Application Priority Data

Feb. 14, 1995 [JP] Japan ................................ 7-025184

[51] Int. Cl.[7] .................................................. C09D 11/10
[52] U.S. Cl. ........................ 523/161; 524/591; 524/839; 524/840; 260/DIG. 38; 104/31.13
[58] Field of Search ........................ 523/161; 106/20 R, 106/20 D, 31.13; 260/DIG. 35; 524/591, 839, 840

[56] References Cited

U.S. PATENT DOCUMENTS

| 4,203,883 | 5/1980 | Hangauer et al. ........................ 524/591 |
| 4,507,431 | 3/1985 | Stutz et al. ................................ 524/840 |
| 4,692,188 | 9/1987 | Ober et al. ................................ 523/300 |
| 4,945,128 | 7/1990 | Hille et al. ................................ 524/591 |

FOREIGN PATENT DOCUMENTS

| 0 130 789 A1 | 1/1985 | European Pat. Off. . |
| 0 466 345 A1 | 1/1992 | European Pat. Off. . |
| 0 556 650 A1 | 8/1993 | European Pat. Off. . |
| 0 586 101 A1 | 3/1994 | European Pat. Off. . |
| 692 528 | 1/1996 | European Pat. Off. . |
| 58-45272 | 3/1983 | Japan . |
| 62-95366 | 5/1987 | Japan . |
| 6-279561 | 10/1994 | Japan . |
| 2 105 735 | 3/1983 | United Kingdom . |
| WO 97/22667 | 6/1997 | WIPO . |

Primary Examiner—Terrel Morris
Assistant Examiner—John J. Guarriello
Attorney, Agent, or Firm—Armstrong, Westerman, Hattori, McLeland & Naughton

[57] ABSTRACT

The present invention provides polymer fine particles for a jet ink, each polymer fine particle containing a colorant, wherein the polymer fine particles have an average particle diameter in the range of 5 to 700 nm, a maximum particle diameter of at most 1000 nm, and a particle size distribution, at m value of shape parameter according to the Weibull distribution, of at least 1.3, and wherein the polymer fine particles are able to form a coating film at room temperature. By using the aforementioned polymer fine particles as essential components according to the present invention, it is possible to provide polymer fine particles for a jet ink which display a superior storage stability, resistance to wear, durability, water resistance, solvent resistance, chemical resistance and the like, in which there is no clogging of the ink jet; and a jet ink comprising the aforementioned polymer fine particles which produces clear prints over a long period of time wherein smudging of the printed matter due to water or sweat does not easily occur.

15 Claims, No Drawings

POLYMER FINE PARTICLES FOR JET INK, PROCESS FOR PRODUCING THE SAME, AND JET INK COMPRISING THE SAME

BACKGROUND OF THE INVENTION

1. Field of the Invention

The present invention relates to polymer fine particles for a jet ink, process for producing the same, and a jet ink comprising as an essential component said polymer fine particles for a jet ink.

The polymer fine particles for a jet ink according to the present invention contain a colorant and have an average particle diameter in the range of 5 to 700 nm, a maximum diameter of at most 1000 nm, and a particle size distribution, at m value of shape parameter according to the Weibull distribution, of at least 1.3.

The polymer fine particles for a jet ink according to the present invention are stable in a dispersion medium such as water and the like, and are able to form a coating film at room temperature. Moreover, the aforementioned polymer fine particles form a coating film which is insoluble in acetone. In addition, the ink comprising the polymer fine particles according to the present invention displays a superior durability and is ideal for use in ink jet recording systems.

2. Background Art

The ink jet recording system, with no waste of ink and the ability to use standard paper, affords many advantages such as being economical, wherein high grade printing, in which coloring is easily accomplished, is possible with limited noise at the time of printing.

However, since aqueous inks primarily comprising water-soluble resins are mainly employed as the ink in the above ink jet recording system, conventionally, significant drawbacks exist when these inks are applied to practical use, such as generation of smudging of the printed matter due to water or sweat, frequent blurring of the printed copies, as well as an inferior durability and resistance to wear.

In order to improve these drawbacks, numerous experiments are being conducted which use a binder instead of the conventional water-soluble resin. For example, in Japanese Patent Application, First Publication No. Sho 58-45272, an ink is disclosed which comprises an aqueous medium and dye-containing polyurethane latex particles which are formed by means of adding a hydrophobic dye to polyurethane latex, previously prepared from a polyol and diisocyanate, which possesses particles of 0.01 to 1.0 microns in diameter, under the presence of an organic solvent such as an acetone-ethyl acetate mixed solvent or the like, and then mixing them.

Additionally, in Japanese Patent Application, First Publication No. Sho 62-95366, a method is disclosed for producing an ink by means of dissolving in a water-insoluble organic solvent, a polymer that is soluble in an organic solvent and an organic oil-soluble dye; the resultant mixture is then suspended in water, dried and redispersed into 0.3~1.0 micron fine particles which contain a dye to form the ink.

Furthermore, in Japanese Patent Application, First Publication No. Hei 6-145570, with regard to an ink for use in ink-jet recording which comprises a pigment and high polymer dispersing agent, and is prepared using a water-insoluble resin emulsion, such as a polyacrylic ester emulsion, a method is disclosed for obtaining a high-grade ink which is free of smudging by means of specifying the compositional ratio thereof.

Unfortunately, these aforementioned processes do not exhibit sufficient improvements with regard to the conventional drawbacks.

SUMMARY OF THE INVENTION

Consequently, in an attempt to solve these problems, it is an object of the present invention to provide polymer fine particles for a jet ink which display superior storage stability, resistance to wear, durability, water resistance, solvent resistance, chemical resistance and the like, in which there is no clogging of the ink jet; and an ink for a jet ink comprising the aforementioned polymer fine particles which produces clear prints over a long period of time wherein smudging of the printed matter due to water or sweat does not easily occur.

In order to accomplish the aforementioned, the inventors of the present invention, as a result of intensive research, have achieved the present invention which solves the problems of the conventional art by means of using in an ink jet recording system, polymer fine particles, preferably urethane-based polymer fine particles possessing a crosslinked molecular structure, each containing a colorant, which are insoluble in organic solvents and are able to form a coating film at room temperature.

Specifically, the present invention is characterized in comprising polymer fine particles for a jet ink, wherein said polymer fine particles, each polymer fine particle containing a colorant, are able to form a coating film at room temperature and have an average particle diameter in the range of 5 to 700 nm, a maximum diameter of at most 1000 nm, and a particle size distribution, at m value of shape parameter according to the Weibull distribution, of at least 1.3.

The polymer fine particles for a jet ink according to the present invention are characterized in being insoluble in an organic solvent, particularly when said organic solvent is acetone, wherein each polymer fine particle possesses a crosslinked molecular structure.

The polymer fine particles for a jet ink according to the present invention are characterized in that each polymer fine particle is a urethane-based fine particle, particularly a urethane-based fine particle containing molecules having substituents capable of forming an ion pair. Furthermore, a carboxyl group is preferably used as the aforementioned substituent capable of forming an ion pair.

In addition, the polymer fine particles for a jet ink according to the present invention are characterized in possessing a spherical shape, wherein said polymer fine particles comprise a urethane-based fine particle obtained by means of reacting a polyol (A) having a substituent capable of forming an ion pair, a polyisocyanate (B), and a polyamine (C) such that said urethane-based fine particle comprises a polyurethane-polyurea structure.

In addition, the present invention comprises a process for producing polymer fine particles for a jet ink, which comprises the steps of: preparing a mixture of a polyol (A) having a substituent capable of forming an ion pair and a colorant; and preparing urethane-based fine particles using said mixture.

That is to say, a process for producing polymer fine particles for a jet ink in which an organic phase is prepared by mixing a polyol (A) having a substituent capable of forming an ion pair and a polyisocyanate (B), in the presence of a non-reactive solvent as necessary, is in the scope of the present invention. This process for producing fine particles for a jet ink in which the polyol (A) having a substituent capable of forming an ion pair is one having a carboxyl group in the molecule is also in the scope of the present invention.

Namely, the present invention comprises a process for producing polymer fine particles for a jet ink, which comprises the steps of:

preparing a mixture of a polyol (A) having a substituent capable of forming an ion pair and a colorant;

preparing an organic phase by mixing said mixture and a polyisocyanate (B), in the presence of a non-reactive solvent; and preparing urethane-based fine particles using said organic phase and a polyamine (C);

wherein molecules of said polyol (A) having a substituent capable of forming an ion pair preferably contains a carboxyl group.

More concretely, the process for producing polymer fine particles for a jet ink according to the present invention is characterized in that said polyisocyanate (B) has the equivalent weight of at least 1 with respect to the sum total of the equivalent weight of hydroxyl groups in said polyol (A) and the equivalent weight of amino groups having active hydrogens in said polyamine (C). Alternatively said polyisocyanate (B) has the equivalent weight of at least 1 with respect to the sum total of the equivalent weight of hydroxyl groups in said polyol (A) containing a carboxyl group, and the equivalent weight of active hydrogens in said polyol (A) containing a carboxyl group and said polyamine (C).

In addition, the process for producing polymer fine particles for a jet ink according to the present invention is further characterized in that said carboxyl group contained in the aforementioned molecule of said polyol (A) is neutralized with a base to form a salt. Furthermore, the present invention is characterized in comprising a jet ink which comprises as an essential component said polymer fine particles for a jet ink.

Consequently, the present invention is able to provide polymer fine particles for a jet ink which display superior storage stability, resistance to wear, durability, water resistance, solvent resistance, chemical resistance and the like, in which there is no clogging of the ink jet; and a jet ink comprising the aforementioned polymer fine particles which produces clear prints over a long period of time wherein smudging of the printed matter due to water or sweat does not easily occur.

DETAILED DESCRIPTION OF THE PREFERRED EMBODIMENTS

In the following, the details of the present invention will be concretely described. Furthermore, the term "jet ink" and "ink jet ink" are generally employed in reference to an ink for use in recording and/or printing according to an ink jet system.

Numerous examples are known which use the terms "ink for use in ink jet recording system", "ink jet printing ink" or "ink jet ink", however, the present invention will refer to these inks as simply "jet ink".

The present invention relates to polymer fine particles for a jet ink, wherein said polymer fine particles, each polymer fine particle containing a colorant, are insoluble in an organic solvent and have an average particle diameter in the range of 5 to 700 nm, a maximum particle diameter of at most 1000 nm (1 μm), and possess a uniform particle size having the particle size distribution, at m value of shape parameter according to the Weibull distribution, of at least 1.3; and a jet ink comprising said polymer fine particles.

It is necessary that each of the polymer fine particles according to the present invention should contain a colorant: in other words, the aforementioned colorant is fundamentally contained within the fine particle in a uniform manner. In addition, the aforementioned polymer fine particles which are insoluble in an organic solvent refer to fine particles which comprise polymer components that possess a crystalline structure, polymer components that are not readily dissolved, or the like; preferably, these polymer fine particles possess a crosslinked molecular structure. In the above case, the organic solvent generally refers to acetone because of the desirable properties that it imparts when used in jet ink.

However, the organic solvent for use in the jet ink can be changed as necessary and includes, for example, joint use of acetone and butanol, or methyl ethyl ketone, or the like. The standard employed for determining insolubility in an organic solvent such as acetone or the like involves immersing a coating film, formed by coating, drying and aging the polymer fine particles of the present invention at room temperature, for an entire day and night at room temperature. Those substances which, upon removal, comprise an insoluble component of at least 50% are determined to be insoluble for the context of the present invention.

With regard to the polymer fine particles for a jet ink according to the present invention, the jet ink formed thereof is used in recording by passing through a minute nozzle of the ink jet. Thus, it is necessary to precisely control the particle size of the aforementioned polymer fine particles. In this manner, the polymer fine particles for a jet ink according to the present invention have an average particle diameter in the range of 5 to 700 nm, and a maximum particle diameter of at most 1000 nm (1 μm).

In addition, in the production of the aforementioned, tight control over the average particle diameter, maximum particle diameter and particle size distribution is required; it is important to note that fine particles possessing a spherical shape and uniform particle size can also be produced by setting and controlling the fine particles to a particular particle size, in addition to optionally determining the control standard thereof.

Normally, the polyurethane-polyurea particle of the present invention takes on an approximate spherical shape from the production process thereof, with the particle diameter similarly requiring a sphere as the basic shape. Since the resultant particles normally comprise a large number of particles of various particle diameters, it is necessary to express the above structure using an average particle diameter and particle size distribution.

As an ideal method relating to the numerical control of particle size, the inventors of the present invention have already reported (*Kobunshi Ronbunshu*, Vol. 50, No. 5, 1993) a method that is capable of expressing the particle size distribution of fine particles using the m value of the shape parameter according to the Weibull distribution, which is widely employed in the conventional art.

Generally, the average particle diameter can refer to the average number, average length, average area or average volume of particles. However according to the present invention, the average particle diameter will refer to the average volume, which is normally employed. In addition, the Weibull distribution is expressed by the following Formula 1.

$$F(t)=1-\exp[-(t/\eta)^m]  \quad \text{(Formula 1)}$$

(In the formula, F(t) represents the Weibull distribution function, t is the particle diameter, η is the scale parameter, and m is the shape parameter.)

Furthermore, a higher m value of the shape parameter expressing the particle size distribution according to the Weibull distribution indicates greater uniformity of particle size, i.e., a higher m value indicates a sharper particle size distribution. Since it is obviously not possible to completely express all particle size distributions by means of the Weibull distribution, the value closest to the maximum limit will be used.

The particle size distribution of the polymer fine particles according to the present invention at m value is at least 1.3, preferably at least 1.5, and more preferably at least 1.8.

In addition, the polymer fine particles according to the present invention, as mentioned above, are able to form a coating film at room temperature, and are preferably insoluble in organic solvent. From the standpoint of properties which are desirable for a jet ink, the polymer fine particles according to the present invention preferably comprise urethane-based crosslinked fine particles possessing a superior durability and the like, and more preferably comprise urethane-based crosslinked fine particles possessing a crosslinked molecular structure which contains urethane bonds.

Various documents exist, as described in the following, which relate to processes for producing urethane-based crosslinked fine particles possessing the aforementioned average diameter. For example, in (a) Japanese Patent Application, Second Publication No. Hei 3-12563, a process is disclosed in which urethane-based crosslinked fine particles are produced as an aqueous dispersion by means of jointly using a polyurethane prepolymer containing a quaternary ammonium group and possessing a terminal isocyanate group with self-dispersing properties, and a multifunctional polyisocyanate, and diluting these compounds with an organic solvent followed by dispersion and removal of the solvent. Similarly, (b) Japanese Patent Application, First Publication No. Hei 3-128912 and (c) Japanese Patent Application, First Publication No. Hei 4-249517 disclose processes in which urethane-based crosslinked fine particles are produced as an aqueous dispersion by means of jointly using a polyurethane prepolymer possessing a terminal isocyanate group with self-dispersing properties and a multifunctional polyisocyanate, as described in the aforementioned document, and dispersing these compounds into water which contains a polyamine.

In addition, as an improved urethane-based crosslinked fine particle, the inventors of the present invention have produced (d) urethane-urea crosslinked fine particles obtained by means of dispersing a polyol possessing substituents capable of forming an ion pair and a polyisocyanate into water which contains a polyamine.

Furthermore, the nomenclature of the aforementioned urethane-urea crosslinked fine particle is based on the probable structure as predicted from the compositional organization and production procedure employed in the formation of a conventional fine particle. However, research results obtained recently by the inventors of the present invention which pertain to the structural analysis of urethane fine particles possessing comparatively large particle diameters, have shown the aforementioned probable structure to be correct (*Preprints of the 5th SPSJ International Polymer Conference*, page 43).

With regard to the polymer fine particles for a jet ink according to the present invention, all of the urethane-based crosslinked fine particles disclosed in the aforementioned documents (a)~(d) are preferred when compared to the conventional fine particle; however, among these aforementioned urethane-based crosslinked fine particle, the polymer fine particles described in (d) are, in particular, preferred.

In other words, according to the above documents (a)~(c), it is necessary to disperse a colorant into an isocyanate prepolymer possessing an isocyanate group at the molecular terminal. However, since isocyanate groups are sensitive to water and moisture, these fine particles are susceptible to the water content of the colorant as well as the moisture contained in the air, and thus much care is required to ensure quality stabilization during production thereof.

In contrast, when the polymer fine particles (d) produced by the inventors of the present invention are used to produce polymer fine particles for a jet ink, a good stability with regard to the colorant results, and it is possible to sufficiently disperse the colorant into the polyol, having a substituent capable of forming an ion pair, beforehand in a stable manner without fear of decomposition.

Subsequently, the production of the crosslinked polymer fine particles for a jet ink according to the present invention can be performed in an extremely simple and stable manner, as described in the following. After mixing the aforementioned polyol and polyisocyanate, and adjusting, as necessary, the viscosity by diluting with an organic solvent and dispersing the mixture in water containing a polyamine, a shell is formed on the surfaces of the fine particles by means of the urea-forming reaction between the isocyanate groups and amine groups. Furthermore, the interior portions of the fine particles are then crosslinked and cured by means of the urethanization reaction between the isocyanate groups and hydroxyl groups within the polyol molecules to yield the crosslinked polymer fine particles for a jet ink of the present invention wherein each particle contains a colorant.

The urethane-based crosslinked fine particle which are particularly desirable in the jet ink of the present invention are polymer fine particles, preferably urethane-based crosslinked fine particle, which are insoluble in organic solvent and have an average diameter in the range of 5 to 700 nm, a maximum diameter of at most 1000 nm, and a particle size distribution, at m value of shape parameter according to the Weibull distribution, of at least 1.3, wherein the polymer fine particles are able to form a coating film at room temperature.

Crosslinked fine particles that are suitable as the aforementioned fine particle contain a colorant and are formed by means of reacting a polyol (A) having a substituent capable of forming an ion pair, a polyisocyanate (B), and a polyamine (C) as essential components. Furthermore, in the aforementioned case, the urethane-based crosslinked fine particle is normally obtained in the form of an aqueous dispersion.

The polyol (A) having a substituent capable of forming an ion pair for use in the present invention is a polyol with a number average molecular weight of 300~10,000 which imparts hydrophilic properties by forming ions in the presence of a substituent capable of forming an ion pair, and which further displays reactivity to polyisocyanate, possessing at least two hydroxyl groups.

For example, there can be mentioned a polyol having a number average molecular weight of 300~10,000 and possessing a carboxyl group which is obtained by means of neutralizing the carboxyl group using a base such as an amine, ammonia or the like to form a salt. As the substituent capable of forming an ion pair, there can be mentioned carboxyl groups, sulfonic groups, phosphoric esters, tertiary amino groups and the like.

Among the aforementioned, carboxyl groups can be mentioned as an example of a preferred substituent because of the ease in which various properties of the fine particles can be balanced, as well as due to the ease in operation. In other words, an ion pair can be easily produced by means of forming a quaternary salt from a polyol possessing a carboxyl group by means of neutralizing the carboxyl group using a base, such as an amine or the like. Normally, polyols possessing a carboxyl group can be easily produced by means of conventional methods. Particularly representative examples of the aforementioned polyol include carboxyl group-containing polyurethane polyols, acrylic polyols, polyester polyols, lactone-modified polyester polyols, polyester amide polyols, alkyd polyols, rosin-modified alkyd polyols, phenol resin-modified rosin esters, polyether polyols, polythioether polyols, polycarbonate polyols, polyacetal polyols, polyolefin polyols, epoxy-modified polyols, silicone-modified polyols, fluorocarbon polyols and the like.

Of course it is also possible to use a polyol possessing an amino group instead of the aforementioned carboxyl group-containing polyols as the polyol (A) having a substituent capable of forming an ion pair.

With regard to the aforementioned representative examples of a polyol (A) having a substituent capable of forming an ion pair, examples of the starting materials and manufacturing methods are provided in the following.

(a) As a polyurethane polyol there can be mentioned a polyol possessing a carboxyl group produced by means of reacting at least one compound selected from a bifunctional alcohol such as ethylene glycol, 1,3-propanediol, 1,2-butanediol, 1,3-butanediol, 1,5-pentanediol, neopentyl glycol, 1,6-hexanediol, 1,4-bis(hydroxymethyl) cyclohexane, bisphenol A, hydrogenated bisphenol A, hydroxypivalyl hydroxypivalate and the like, a trifunctional or higher alcohol such as trimethylolethane, trimethylolpropane, glycerin, hexanetriol, pentaerythritol and the like, polyether polyols such as polypropylene glycol, polypropylenetriol, polytetramethylene glycol and the like, and/or a polyol of the aforementioned; at least one diisocyanate compound (monomer) to be mentioned hereafter and/or polyisocyanate derived therefrom; and a diol containing a carboxyl group such as dimethylolpropionic acid and the like.

(b) As an acrylic polyol, there can be mentioned an acrylic polymer possessing a hydroxyl group and carboxyl group within its molecular structure which is formed by means of copolymerizing a hydroxyl group-containing acrylic monomer, e.g., β-hydroxyethyl methacrylate, β-hydroxypropyl methacrylate, β-hydroxyethyl acrylate, β-hydroxypropyl acrylate and the like; a carboxyl group-containing monomer such as methacrylic acid, itaconic acid, and the like; and another acrylic monomer that can be copolymerized with the aforementioned monomers, e.g., methyl methacrylate, butyl methacrylate, 2-ethylhexyl methacrylate, ethyl acrylate and the like, dibutyl maleate, styrene and the like. Furthermore, it is also possible to easily produce a compound possessing an optional number of hydroxyl groups in the same molecule by means of adjusting the design of the aforementioned carboxyl group-containing polyol.

(c) As a polyester polyol, there can be mentioned any polyester polyol possessing a residual carboxyl group produced by means of performing copolycondensation of at least one polyhydric alcohol, as mentioned above, and a polycarboxylic acid. Representative examples of the aforementioned polycarboxylic acid include the following: adipic acid, sebacic acid, azelaic acid, phthalic acid, tetrahydrophthalic acid, hexahydrophthalic acid, maleic acid, fumaric acid, citraconic acid, itaconic acid, 1,2,5-hexatricarboxylic acid, 1,4-cyclohexanedicarboxylic acid, 1,2,4-benzenetricarboxylic acid, 1,2,5-benzenetricarboxylic acid, 1,2,4-cyclohexanetricarboxylic acid, 2,5,7-naphthalenetricarboxylic acid and the like.

(d) As a lactone-modified polyester polyol there can be mentioned a lactone-based polyester polyol possessing a residual carboxyl group which can be easily obtained, for example, by means of performing a ring-opening polymerization using a polyester polyol described in (a) above, and a lactone such as ε-caprolactone, δ-valerolactone, 3-methyl-δ-valerolactone and the like.

(f) An alkyd polyol can be easily produced, for example, by means of using a monoglyceride obtained by transesterification of fat and/or oil with glycerin in place of the bifunctional alcohol in the preparation of a polyester polyol described in (a) above.

(g) A polyether polyol can be obtained from the urethanization reaction product of at least one polyether glycol or triol such as polyoxyethylene glycol, polyoxypropylene glycol, polyoxypropylenetriol, polyoxytetramethylene glycol, polyoxypropylene-oxytetramethylene glycol copolymer and the like; at least one multifunctional polyisocyanate; and a carboxyl group-containing diol such as dimethylolpropionic acid and the like; or by means of copolymerizing at least one of the aforementioned polyether polyols with a polycarboxylic acid.

(i) As a polythioether polyol there can be mentioned carboxyl group-containing polythioethers formed by means of a condensation reaction between a thiodiglycol; an aforementioned polyhydric alcohol, polycarboxylic acid, formaldehyde, amino alcohol or aminocarboxylic acid; and a carboxyl group-containing diol such as dimethylolpropionic acid and the like.

(j) As a polycarbonate polyol there can be mentioned carboxyl group-containing polyols formed by means of reacting an aforementioned polyhydric alcohol and a carboxyl group-containing diol such as dimethylolpropionic acid or the like with a diaryl carbonate, e.g., diphenyl carbonate.

(k) As a polyacetal polyol there can be mentioned carboxyl group-containing polyols formed, for example, by means of reacting a glycol, hexanediol or trimethylolpropane or the like, and a carboxyl group-containing diol such as dimethylolpropionic acid or the like, with formaldehyde.

(l) As a polyolefin polyol there can be mentioned carboxyl group-containing polyols formed, for example, by means of adding maleic acid, itaconic acid and the like to a multifunctional butadiene prepolymer, isoprene prepolymer or the like possessing a terminal hydroxyl group.

(m) As an epoxy-modified polyester polyol, there can be mentioned multifunctional polyols formed by means of jointly using at least one compound selected from among various epoxy compounds such as bisphenol A-type epoxy compounds, hydrogenated bisphenol A-type epoxy compounds, glycidyl ethers of monohydric and/or polyhydric alcohols or glycidyl esters of monobasic and/or polybasic acids, at the time of synthesizing the aforementioned polyester polyol.

(n) As a silicone-modified polyol, there can be mentioned various silicone polyols formed by means of reacting a silicone compound, which is a polyol possessing a siloxy bond within the molecule, containing a reactive group with one part of an aforementioned polyol starting material. Particularly representative examples of a silicone compound containing a reactive group include: hydroxyl group-containing silicone compounds such as X-22-160-AS, X-22-160A, X-22-160B, X-22-160C and the like (produced by Shin-Etsu Chemical Co., Ltd.), SH-3746, SF-8428, SH-3771, BY-16-036, BY-16-027, BY-16-038 and the like (produced by Dow Corning Toray Silicone Co., Ltd.); amino group-containing silicone compounds such as X-22-161-

AS, X-22-161A, X-22-161B, X-22-161C and the like (produced by Shin-Etsu Chemical Co., Ltd.), BY-16-828, BY-16-850, BY-16-841, BY-16-849, BY-16-872 and the like (produced by Dow Corning Toray Silicone Co., Ltd.); glycidyl group-containing silicone compounds such as X-22-163-AS, X-22-163A, X-22-163B, X-22-163C and the like (produced by Shin-Etsu Chemical Co., Ltd.), SF-8413, SF-8411 and the like (produced by Dow Corning Toray Silicone Co., Ltd.); vinyl group-containing silicone compounds such as-X-22-164-AS, X-22-164A, X-22-164B, X-22-164C and the like (produced by Shin-Etsu Chemical Co., Ltd.); and thiol group-containing silicone compounds such as X-22-167-AS, X-22-167A, X-22-167B, X-22-167C and the like (produced by Shin-Etsu Chemical Co., Ltd.). Trifunctional or higher silicone polyols can be formed by means of reacting any of the various aforementioned reactive silicone compounds at the time of synthesizing an aforementioned trifunctional or higher polyol.

(o) As a fluorocarbon polyol, i.e., a polyol having molecules containing a fluorine atom, there can be mentioned carboxyl group-containing multifunctional fluorocarbon polyols formed, for example, by means of copolymerizing a fluorovinyl monomer represented by vinylidene fluoride, tetrafluoroethylene, chlorotrifluoroethylene, hexafluoropropylene, (per)fluoroalkyl ether (note: alkyl group contains 1~18 carbon atoms), and perfluoroalkyl trifluorovinyl ether in which the alkyl group contains 1~18 carbon atoms; a hydroxyl group-containing vinyl monomer; a carboxyl group-containing vinyl monomer; and another vinyl monomer that is copolymerizable with the aforementioned compounds.

According to the present invention, it is possible to use any of the aforementioned polyols (A) alone or in combinations of two or more. In order to ensure that the interior portions of the polymer fine particles undergo sufficient crosslinkage, the number average molecular weight of polyol (A) is 300~50,000, preferably 500~30,000, and more preferably 1,000~10,000.

In addition, it is also possible to use polyol (A) in the above reaction in a diluted state by dissolving the polyol (A) in an organic solvent. In the case when the substituent capable of forming an ion pair contained in polyol (A) is an acid group such as a carboxyl group or the like, this group is first neutralized using a base such as a tertiary amine, e.g., triethylamine, tripropylamine, tributylamine, or ammonia and the like to form a salt, i.e., a quaternary ammonium salt, and then used in the ion pair state.

The aforementioned substituent capable of forming an ion pair can be easily introduced into polyol (A) according to the present invention. A representative example of this substituent capable of forming an ion pair is a carboxyl group. In the case of a polyol containing a carboxyl group, use of a compound with an acid concentration therein expressed by an acid value of 15~100, preferably 20~60, is effective in producing an aqueous dispersion of stable fine particles. When the acid value of the aforementioned polyol (A) is too low, the formation of fine particles possessing a fine particle size according to the present invention becomes difficult, while an acid value that is too high is similarly undesirable in terms of the properties, e.g., durability of the fine particles.

Generally, examples of polyol (A) include polyester polyols, alkyd polyols, polyurethane polyols, hydroxyl-group containing vinyl copolymers and the like. However, polyol (A) is not limited to these aforementioned polyols, as other polyols may also be used when necessary.

On the other hand, conventional isocyanates are generally used as the isocyanates comprising the aforementioned polyisocyanate (B); among these conventional isocyanates, particularly representative examples include aromatic diisocyanates and triisocyanates such as tolylene diisocyanate, diphenylmethane 4,4'-diisocyanate, xylene diisocyanate, naphthalene 1,5-diisocyanate, p-phenylene diisocyanate, dibenzyl diisocyanate, diphenyl ether diisocyanate, m- or p-tetramethylxylene diisocyanate, triphenylmethane triisocyanate and the like; aliphatic and alicyclic compounds such as hydrogenated tolylene diisocyanate, hydrogenated diphenylmethane 4,4'-diisocyanate, 1,4-tetramethylene diisocyanate, 1,6-hexamethylene diisocyanate, hydroxylene diisocyanate, cyclohexyl 1,4-diisocyanate, isophorone diisocyanate and the like. According to the present invention, at least one type of the aforementioned isocyanates may be used to comprise polyisocyanate (B) which, in turn, may be used alone or in combinations of two or more.

Alternatively, various isocyanate prepolymers comprising trifunctional or higher derivatives of the aforementioned isocyanate monomers such as a polyisocyanurate-based polyisocyanate, adduct-type polyisocyanate, biuret-type polyisocyanate and the like, can also be preferably used as polyisocyanate (B).

Furthermore, particularly when desirable, it is also possible to use at least one urethane-modified polyisocyanate prepolymer possessing a terminal isocyanate group which can be obtained by means of conducting a urethanization reaction between at least one of the aforementioned isocyanate monomers or polyisocyanates; and at least one polyhydroxy compound such as an aforementioned polyhydric alcohol, polyurethane polyols, acrylic polyols, polyester polyols, lactone-modified polyester polyols, polyester amide polyols, alkyd polyols, polyether polyols, modified polyether polyols, polythioether polyols, polycarbonate polyols, polyacetal polyols, polyolefin polyols, epoxy-modified polyols, silicone polyols, fluorocarbon polyols and the like.

With regard to the selection of polyisocyanate (B), use of an aliphatic and/or alicyclic isocyanate monomer as the starting material isocyanate monomer is preferred from the standpoint of anti-weatherability and mechanical properties. Furthermore, use of isocyanate prepolymers thereof as the polyisocyanate (B) are preferred when considering the safety and toxicity during handling.

In order to produce crosslinked fine particles possessing superior properties, the number average molecular weight of polyisocyanate (B) is within the range of 100~3,000, preferably 200~2,000, and more preferably 400~1,500.

An appropriate polyamine (C) for use in the present invention comprises a conventional diamine, polyamine or mixture thereof. Particularly representative examples of these polyamines include 1,2-ethylenediamine, bis(3-aminopropyl)amine, hydrazine, hydrazine-2-ethanol, bis(2-methylaminoethyl)methylamine, 1,4-diaminocyclohexane, 3-amino-1-methylaminopropane, N-hydroxyethylethylenediamine, N-methylbis(3-aminopropyl)amine, tetraethylenediamine, hexamethylenediamine, 1-aminoethyl-1,2-ethylenediamine, bis(N,N'-aminoethyl)-1,2-ethylenediamine, diethylenetriamine, tetraethylenepentamine, pentaethylenehexamine, phenylenediamine, tolylenediamine, 2,4,6-triaminotoluene trihydrochloride, 1,3,6-triaminonaphthalene, isophoronediamine, xylenediamine, hydroxylenediamine, 4,4'-diaminophenylmethane, hydrogenated 4,4'-diaminodiphenylmethane, or silicone-based polyamines such as X-22-161-AS, X-22-161-A, X-22-161-B, X-22-161-C (produced by Shin-Etsu Chemical Co., Ltd.), BY-16-828, BY-16-850, BY-16-8417, BY-16-849, BY-16-872

(produced by Dow Corning Toray Silicone Co., Ltd.); and further polyamine monomer derivatives such as fluoropolyamines and the like comprising compounds formed by adding a perfluoroalkyl compound such as perfluorooctyl chloride, perfluorooctyl sulfide and the like to a polyamine such as diethylenetriamine and the like. However, from the standpoint of anti-weatherability, use of an aliphatic and/or alicyclic is preferred.

As the colorant contained in the polymer fine particles for a jet ink according to the present invention, it is possible to use either dyes or pigments, as long as the substance can be dissolved in an organic solvent or dispersed in fine particles. Particularly representative examples of the aforementioned dye include azo dyes (e.g., yellow, red, orange, etc.), metal complex salt dyes, naphthol dyes, anthraquinone dyes (e.g., violet, blue, etc.), triarylmethane dyes (violet), azine dyes (purplish red), indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes, phthalocyanine dyes and the like.

Examples of the aforementioned pigment include insoluble azo pigments (e.g., yellow . . . Disazo Yellow AAA, Disazo Yellow AAMX, Fast Yellow 10G, etc.; orange . . . Disazo Orange PMT, Dianisidine orange, etc.), Azo Lake red pigments (e.g., red . . . Watchung Red (Ba), (Ca), (Sr), Lake Red C, Brilliant Carmine 6B, etc.), quinacridone pigments (e.g., red . . . Quinacridone Magenta; purple . . . Quinacridone Red, etc.), phthalocyanine pigments (e.g., blue . . . copper phthalocyanine blue-α-type, β-type, non-crystalline, non-cohesive β-type; green . . . copper phthalocyanine green, etc.), and the like.

With regard to the amount of the dye or pigment to be contained in the jet ink comprising, as an essential component, the polymer fine particles for an ink jet according to the present invention, since the amount of the polymer fine particles contained in the ink is 1~50% by weight, by means of using 1~30% by weight of the dye or pigment in the polymer fine particles, the dye or pigment will be contained in an amount of 2~10% by weight of the entire ink.

As a general procedure for producing the desired polymer fine particles of the present invention, the process disclosed above by the inventors of the present invention can be mentioned. Specifically, the fine particles of the present invention, i.e., the urethane-based crosslinked fine particles are obtained by means of preparing a mixture of a polyol (A) having a substituent capable of forming an ion pair, e.g., a polyol containing a carboxyl-group, and a colorant; neutralizing (quaternary salt formation) this mixture using a tertiary amine or ammonia, and immediately mixing with a polyisocyanate (B); and then dispersing this mixture into a medium containing a polyamine (C), normally an aqueous medium, followed by aging thereof.

In the process for producing the aforementioned fine particles, the polyisocyanate (B) has the equivalent weight of at least 1.0 with respect to the sum total of the equivalent weight of hydroxyl groups in polyol (A) and the equivalent weight of amino groups in polyamine (C).

More concretely, the ratio of the equivalent weight of the hydroxyl groups in polyol (A) possessing a substituent capable of forming an ion pair to the equivalent weight of isocyanate in polyisocyanate (B) is 0.1:1~0.9:1, preferably 0.1:1~0.8:1, and more preferably 0.2:1~0.7:1. It is also desirable for the mixture, obtained by mixing these two components according to the aforementioned range, to form a three-dimensional crosslinked composition.

In other words, at the time of running the urethanization reaction to completion, it is necessary to combine the mixture such that a gel is formed without dissolving in the solvent. In addition, the polyamine (C) is combined at an equivalent weight of 0.2~1.0, preferably 0.3~1.0, and more preferably 0.4~0.9 per one equivalent weight of the isocyanate group.

With regard to the polymer fine particles for a jet ink according to the present invention, by promoting a three-dimensional urethanization reaction within the interior of the fine particle, it is possible to improve the overall toughness and solvent resistance of the particle which were unattainable according to the conventional technology. For the three-dimensional urethanization reaction, it is not necessary for the entire polyol (A) and/or polyisocyanate (B) to have trifunctional or higher functional groups, however, it is required that at least a portion of the polyol (A) and/or polyisocyanate (B) comprise a trifunctional or higher functional group. In addition, it is also effective to add a trifunctional or higher polyamine as well.

In other words, it is possible to obtain an excellent three-dimensional crosslinked structure within the particle interior by using, as the reaction components, a polyol (A) and/or polyisocyanate (B) possessing a trifunctional or higher functional group in an amount not less than 0.1 molar percent, preferably not less than 0.2 molar percent, and more preferably not less than 0.3 molar percent of the total amount of polyol (A) and polyisocyanate (B), with the remaining portion comprising a polyol and/or polyisocyanate possessing normal bifunctional ion-forming capacity.

The three-dimensional crosslinked structure of the present invention comprises a gel component ratio of at least 50%, preferably at least 60% and more preferably at least 70%, according to a gel component ratio measuring method following 24 hours of immersion in acetone.

In the present invention, it is also possible to improve the dispersibility in the aqueous phase by means of reducing the viscosity of the mixture by adding a nonreactive organic solvent, as needed, to the organic phase that is to be dispersed in the aqueous phase. Any organic solvent can be used as long as it does react with the polyol (A) containing an ion forming group, polyisocyanate (B), organic metal catalyst (catalyst promoting urethane formation), and polyamine (C).

Examples of this solvent include esters, ethers, ketone-type hydrocarbons, aromatic hydrocarbons, and aliphatic hydrocarbons. In particular, ethyl acetate, butyl acetate, methyl ethyl ketone, acetone, cyclohexanone, toluene, xylene, cyclohexane, methylcyclohexane, diphenyl ether, N-methyl-2-pyrrolidone, mineral spirits and the like. It is also possible to remove or substitute these solvents as needed by treating with heat, applying reduced pressure, or conducting solvent substitution during or after the formation of the fine particles.

In addition, inclusion of at least one of the following compounds in the aqueous phase into which the aforementioned organic phase is dispersed, will not hinder the present invention; the aforementioned compound being selected from among various surface active agents such as nonionic, anionic, or cationic surface active agents; various protective colloids such as polyvinyl alcohol, hydroxyalkyl cellulose, carboxyalkyl cellulose, gum arabic, polyacrylate, polyacrylamide, polyvinylpyrrolidone, ethylene-maleic anhydride copolymer and the like. However, when, in particular, water resistance is required, use of an aforementioned surface active agent or protective colloid is undesirable.

A characteristic of the present invention is the aggressive promotion of a urethanization reaction in the interior of the urethane-based fine particles; however, according to the conventional technology, the reaction speed of a urethanization reaction between a hydroxyl group and isocyanate group (particularly when the isocyanate group belongs to an aliphatic or alicyclic compound) has a tendency to be quite slow when compared with a urea-forming reaction with an amino group.

As conventionally known, the reactivity of water and an isocyanate group is extremely low (slow) when compared to the reactivity with a hydroxyl group. In addition, normally, isolated effects can be obtained by means of creating an external wall by addition of a polyamine (C).

In this manner, it is possible to ignore the permeation of water into the fine particle interior, which in turn allows the desired urethanization reaction within the fine particle interior to occur upon raising the reaction temperature and allotting time for the reaction. However, promotion of this aforementioned reaction is preferred by means of employing a organic metal catalyst.

As this organic metal catalyst, it is possible to use at least one of the following conventional compounds which promotes the reaction between an isocyanate group and hydroxyl group: cobalt naphthenate, zinc naphthenate, tetra-n-butyltin, tri-n-butyltin acetate, n-butyltin chloride, trimethyltin hydroxide, dimethyltin dichloride, dibutyltin diacetate, dibutyltin dilaurate, tin octenate, potassium oleate, and the like.

In other words, by adding 5~10,000 ppm, preferably 8~5,000, and more preferably 10~10,000 of the aforementioned organic metal catalyst to the organic phase, it is possible to obtain tough crosslinked fine particles in an extremely short period of time.

As the method for adding the catalyst, it is possible to obtain a polyurethane-polyurea crosslinked fine particle dispersion by means of performing the catalyst addition in between dispersion of the organic phase into the aqueous phase and addition of the polyamine (C). However, it is even more desirable to add the catalyst to the organic phase before performing the aqueous dispersion (fine particle dispersion).

By means of adding the aforementioned catalyst to the organic phase before performing the aqueous dispersion (fine particle dispersion), it is possible to achieve a more uniform dispersion of the catalyst into the polyol (A)-polyisocyanate (B) mixture within the organic phase without incurring the effects of water, as opposed to when adding the catalyst following aqueous phase dispersion. This in turn imparts even more desirable results in that the crosslinking within the interior of the fine particles becomes uniform, and a high quality polyurethane-polyurea crosslinked fine particle dispersion is produced.

Addition of the aforementioned catalyst following addition of the polyamine (C) is undesirable since this procedure tends to reduce the promotion of the urethanization reaction within the fine particle interior because of the difficulty encountered in incorporating the catalyst into the fine particle interior due to the continued formation of the fine particle external wall.

As the colorant to be incorporated into the polymer fine particles of the present invention, it is possible to use any of the aforementioned dye and/or pigments.

In the case when polymer fine particles are manufactured according to the present invention, the colorant to be incorporated into the fine particle can be previously dispersed and incorporated or dissolved in the polyol (A) of the organic phase. As a result, it is extremely easy to produce fine particles displaying an enhanced stability with regard to quality.

In addition, when particularly desirable, it is also possible to incorporate other materials into the polymer fine particles of the present invention other than a colorant. Such "core" material for incorporation is introduced into the organic phase, and then incorporated into the polyurethane-polyurea crosslinked fine particle dispersion interior. The range, type, etc. of the "core" material is not particularly limited, and can encompass a wide variety of compounds. The main "core" material in the present invention is obviously a colorant, however, it is also possible, depending on the case, to jointly use a perfume, magnetic material, foaming agent, and the like.

When designing the polymer fine particle, by appropriately selecting various conditions such as the type of substituent forming an ion pair contained in polyol (A) comprising the organic phase, usage amount, degree of neutralization or stirring speed, reaction temperature, etc. of the dispersion process, it is possible to freely design and adjust the crosslinking density and particle diameter of the polymer fine particles for a jet ink.

The average particle diameter of the polymer fine particles according to the present invention can be easily measured by means of a dynamic light scattering measuring method, e.g., by means of a particle size distribution measuring system such as "Photal LAP-3000/3100" (manufactured by Otuka Electronics Co., Ltd.). The average particle diameter of the polymer fine particles for a jet ink according to the present invention is in the range of 5~700 nm, preferably 10~500 nm, with a maximum particle diameter of at most 1000 nm, preferably 800 nm or less. The particle size distribution of these aforementioned polymer fine particles, at m value of shape parameter according to the Weibull distribution, is at least 1.3, preferably at least 1.5, and more preferably at least 1.8.

An average particle diameter exceeding 700 nm is undesirable since clogging of the ink jet results. In addition, when scattering of the particle diameter is large, i.e., when the particle size distribution at m value of shape parameter according to the Weibull distribution is 1.2 or lower, it is not to say that such particles cannot at all be used as polymer fine particles for a jet ink, however, clogging within the ink jet apparatus occurs easily as a result their use. Furthermore, since particles with a maximum particle diameter exceeding 1000 nm are undesirable but easily formed, it is also possible to remove such polymer fine particles comprising large particle diameters by means of a filtering member or the like possessing an pore diameter of approximately 0.1 $\mu$m.

The most important feature of the polymer fine particles for a jet ink according to the present invention is that the polymer fine particles are able to form a coating film at room temperature and are insoluble in organic solvent. Therefore, by using the polymer fine particles for a jet ink according to the present invention, it is possible to obtain superior properties which were not observed by means of the conventional technology.

Ink jet systems include a thermal bubble jet system, piezoelectric system, continuous system, and the like, wherein it is necessary to change the viscosity, composition, etc. of the jet ink according to the system; however, by using the polymer fine particles for a jet ink according to the present invention, it is possible to adapt the jet ink to any of these systems by simply changing the composition of the various components therein.

The jet ink of to the present invention contains the polymer fine particles for a jet ink incorporating a colorant according to the present invention, water which serves as the main solvent, and, when necessary, a drying inhibitor to prevent drying thereof. This drying inhibitor basically prevents drying of the ink at the injection nozzle opening of the ink jet. Normally, any such substance with a boiling point at least equal to that of water can be employed. In addition, with regard to the water serving as the main solvent of the ink for use in an ink jet, in order to avoid clogging of the nozzle, use of water comprising a grade equal to at least that of filtered, ion-exchange water is preferred.

As the aforementioned drying inhibitor, it is possible to use solvents that are conventionally employed in inks for ink jets, for example, polyhydric alcohols such as ethylene glycol, diethylene glycol, polyethylene glycol, glycerin and the like, pyrrolidones such as N-methyl-2-pyrrolidone, 2-pyrrolidone and the like, amides, dimethyl sulfoxide, imidazolidinone and the like. However, the drying inhibitor is not limited to the aforementioned.

The usage amount of the drying inhibitor differs according to the type used, however, normally the usage amount is appropriately selected from the range of 1~150 parts by weight per 100 parts by weight of water. In addition, in order to enhance the penetration of the ink into the paper onto which it has been jet-injected and adhered, it is also possible to add, when necessary, a water-soluble organic solvent which imparts penetrating properties to the ink.

As this agent for imparting penetrating properties to the ink there can be mentioned lower alcohols such as ethanol, isopropyl alcohol and the like, glycol ethers such as diethylene glycol n-butyl ether and the like . However, the aforementioned agent for imparting penetrating properties is not limited to these compounds. Similarly, the usage amount of the agent for imparting penetrating properties is not particularly limited, as long as the amount is within a range capable of achieving the desired effects with regard to the present invention. A usage amount which will comprise 0.1~10% by weight of the resultant jet ink is, however, preferred.

Furthermore, when particularly desirable, it is also possible to add various additives as necessary, e.g., water-soluble resins such as acrylic acid resins, polyvinyl alcohols and the like; alkali pH conditioners such as sodium carbonate, potassium hydroxide, N-methyldiethanolamine, triethanolamine and the like; acidic pH conditioners such as acetic acid, glycolic acid and the like; anionic or nonionic surface active agents for enhancing dispersion, defoaming or penetration to the paper; antiseptics or anti-mildew preservatives such as sodium benzoate, sodium dehydroacetate, sodium 2-pyridinethiol-1-oxide, and the like; chelating agents such as ethylenediamine tetra acetic acid tetra sodium salt, and the like. Generally, the addition amount of these additives is within the range of 0.01% to a few percent.

In the following, the present invention will be explained in greater detail by means of the Reference Examples and Examples. Hereafter, unless noted otherwise, the terms "parts" and "%" represent the weight standard (i.e., parts by weight or % by weight).

REFERENCE EXAMPLE 1
(Preparation of a polyol (A) with ion-forming properties)

62 parts of 2,2-dimethylolpropionic acid, 156 parts of isophorone diisocyanate, and 200 parts of ethyl acetate were placed into a flask, and the temperature was raised and maintained at 80° C. for 4 hours while stirring under a nitrogen seal. After the reduction of the isocyanate group content disappeared, the temperature was lowered to 50° C., 582 parts of "Placcell 212" (polycaprolactonediol; average molecular weight=1250 manufactured by Dicel Chemical Industries, Ltd.) were added, and the mixture was allowed to react for 2 hours at 80° C.

After elimination of the isocyanate group was confirmed by means of infrared-absorbing analysis (hereafter referred to as "IR"), the target resin was obtained with a non-volatile content of 80%, solution acid value of 26, solution hydroxyl group value of 26, and a Gardner viscosity at 25° C. of Z6. This resin was labeled PO-1.

REFERENCE EXAMPLE 2
(Preparation of a polyol (A) with ion-forming properties)

Initially, a mixture was prepared from 250 parts of styrene, 157 parts of methyl methacrylate, 63 parts of β-hydroxyethyl methacrylate, 30 parts of methacrylic acid, and 8 parts of "Perbutyl O" (tert-butyl peroxyoctate manufactured by Nippon Oil & Fats Co., Ltd.). 75 parts of this mixture were then placed with 500 parts of methyl ethyl ketone (MEK) into a flask and maintained at a temperature of 75° C. for 30 minutes while stirring under a nitrogen seal.

The remaining portion of the mixture was then added dropwise over a period of 2 hours, and further allowed to react for 12 hours at the same temperature to yield the target resin comprising a non-volatile content of 50%, solution acid value of 20, solution hydroxyl group value of 25, and a viscosity of Z. This resin was labeled PO-2.

REFERENCE EXAMPLE 3
(Preparation of a polyol (A) with ion-forming properties)

123 parts of 1,6-hexanediol, 83 parts of neopentyl glycol, 424 parts of adipic acid, and 71 parts of 2,2-dimethylolpropionic acid were placed into a flask and maintained at 150° C. for 2 hours. The esterification reaction was then carried out by means of increasing the temperature to 230° C. over the course of 5 hours, and then maintaining the same temperature for an additional 8 hours.

Subsequently, the temperature was lowered to 50° C., and 300 parts of YEK were added to produce the target resin comprising a non-volatile content of 70%, solution acid value of 40, solution hydroxyl group value of 44, and a Gardner viscosity at 25° C. of Z2-Z3. This resin was labeled PO-3.

(Polyisocyanate compound)
As the polyisocyanate compound, the following two types of compounds were used.

(1) The solid content of "Burnock DN-950" (hexamethylene diisocyanate adduct-type polyisocyanate resin; solid content reduced isocyanate group concentration=16.8%; produced by Dainippon Ink and Chemicals, Inc.). This compound was labeled PI-1.

(2) "Burnock DN-980S", (isocyanurate-type polyisocyanate resin formed by using hexamethylene diisocyanate; isocyanate group concentration=21.0%; produced by Dainippon Ink and Chemicals, Inc.). This compound was labeled PI-2.

EXAMPLE 1

After 18.8 parts of C.I. Solvent Black 43 (produced by Hodogaya Chemicals Co., Ltd.) were dissolved in 136 parts of methyl ethyl ketone (MEK), 146 parts of PO-1 and 7.5 parts of TEA were mixed in. In addition, 41 parts of PI-2 and 0.1 parts of dibutyltin dilaurate were also mixed therein to produce an organic phase. This organic phase was then introduced gradually into an aqueous phase formed from 628 parts of water and stirred well by means of a stirring apparatus to form a dispersion.

Subsequently, an aqueous solution comprising 31 parts of water and 3.5 parts of diethylenetriamine was gradually introduced to the above dispersion and stirred for 30 minutes. After maintaining the resultant mixture at 80° C. for 1 hour, vacuum distillation was performed at the same temperature to remove the MEK and the like contained in the dispersion fluid.

The resultant fine particle dispersion exhibited a non-volatile content of 25% and an average particle diameter of 0.09 μm according to a particle size distribution measuring apparatus "Photal LAP-3000/3100" (particle size distribution measuring system manufactured by Otuka Electronics Co., Ltd.). [Note: hereafter all measurements of the average particle diameter were conducted in the same manner using the aforementioned apparatus]. In addition, the particle size distribution at m value of shape parameter according to the Weibull distribution (hereafter referred to as "m-value") was 1.9. This fine particle dispersion was labeled MG-1.

EXAMPLE 2

With the exception of dissolving 42.2 parts of C.I. Solvent Black 43 in 136 parts of methyl ethyl ketone (MEK), Example 2 was performed in an identical manner to Example 1 to produce a fine particle dispersion comprising a non-volatile content of 25%, an average particle diameter of 0.21 μm, and an m-value of 1.6. This fine particle dispersion was labeled MG-2.

EXAMPLE 3

Example 3 was performed in an identical manner to Example 1 with the exception of the following: 17.3 parts of C.I. Solvent Black 43 were dissolved in 63 parts of methyl ethyl ketone (MEK); 206 parts of PO-2, 59 parts of PI-1 and 4 parts of TEA were added to form the organic phase; the aqueous phase comprised 621 parts of water; and the aqueous solution was formed from 43 parts of water and 4.7 parts of diethylenetriamine. As a result, a fine particle dispersion comprising a non-volatile content of 25%, having an average particle diameter of 0.12 μm, and an m-value of 1.5 was obtained. This fine particle dispersion was labeled MG-3.

EXAMPLE 4

40 parts of "MICROPIGMO WMBK-5" (produced by Oriental Chemical Industries, Ltd.) and 137 parts of PO-3 were mixed while stirring, and then heated to 60° C. under reduced pressure to remove the water and MEK. 194 parts of MEK and 11 parts of TEA in addition to 58 parts of PI-2 and 0.1 parts of dibutyltin dilaurate were then uniformly mixed to yield the organic phase. This organic phase was then introduced gradually into an aqueous phase formed from 644 parts of water and stirred well by means of a stirring apparatus to form a black-colored dispersion.

An aqueous solution formed from 25 parts of water and 2.8 parts of hydrazine was then introduced into this dispersion and stirred for 30 minutes. After maintaining the resultant mixture at 80° C. for 1 hour, vacuum distillation was performed at the same temperature and the solvent was remove to yield a black-colored fine particle dispersion comprising a non-volatile content of 25%, an average particle diameter of 0.32 μm, and an m-value of 1.5. This fine particle dispersion was labeled MG-4.

COMPARATIVE EXAMPLE 1

10 parts of C.I. Solvent Black were dissolved in 90 parts of MEK, and a black-colored dispersion comprising a non-volatile content of 10% was obtained. This fine particle dispersion was labeled MG-5.

COMPARATIVE EXAMPLE 2

After 10 parts of C.I. Solvent Black 43 were dissolved in 50 parts of MEK, 225 parts of "Watersol S-744" (water-soluble acrylic resin; non-volatile content=40% produced by Dainippon Ink and Chemicals, Inc.) were mixed in. In addition, 500 parts of water were also mixed therein and vacuum distillation was performed at 80° C. to remove the solvent to yield a black-colored fine particle dispersion comprising a non-volatile content of 25%, an average particle diameter of 0.32 μm, and an m-value of 1.2. This fine particle dispersion was labeled MG-6.

Inks for use in an ink jet were then formed in the following manner using the black-colored fine particle dispersions obtained in Examples 1~4 and Comparative Examples 1 and 2. These inks were then compared, the results of which are summarized in Table 1. The evaluation test items as well as the outlines for each test are also described below.

(Preparation and Printing of the Ink)

20 parts each of glycerin and water were blended into 60 parts of each black-colored fine particle dispersion which had been previously passed through a millipore filter of pore diameter 1.0 μm. The resultant mixture was then stirred to produce a jet ink for evaluation. Each resultant ink was then applied to PPC paper manufactured by Fuji Xerox Co., Ltd., to print characters by means of a piezoelectric-type ink jet printer (IO-735 produced by Sharp Corporation).

| | |
|---|---|
| Storage Stability: | Each respective black-colored fine particle dispersion was placed into a 100 cc glass bottle, and the precipitation state after allowing to sit for 30 days at 40° C. was evaluated by observation. |
| Shelf Drying Properties: | The ink was dripped onto a slide glass and the drying characteristics upon evaporation of the water content were evaluated. |
| Spotting: | The printed matter was placed under a magnifying lens, and the degree of spotting of lines characterized by a so-called "feathering pattern" was evaluated. |
| Water Resistance: | The external appearance of printed matter, onto the surface of which water was dripped, was evaluated. |

The standards for evaluating each of the aforementioned characteristics is described below.

TABLE 1

| Manufactured Ink | Storage Stability | Shelf Drying Properties | Spotting | Water Resistance |
|---|---|---|---|---|
| MG-1 Ink | ⊚ | ⊚ | ⊚ | ⊚ |
| MG-2 Ink | ○ | ⊚ | ⊚ | ⊚ |
| MG-3 Ink | ⊚ | ⊚ | ⊚ | ○ |
| MG-4 Ink | ⊚ | ○ | ⊚ | ⊚ |
| MG-5 Ink | ⊚ | ○ | XX | XX |
| MG-6 Ink | ○ | ○ | X | X |

⊚ Good
○ Moderately good
Δ Only slight abnormalities present
X Partial abnormalities present
XX Undesirable abnormalities present

What is claimed is:

1. Polymer fine particles for a jet ink, each polymer fine particle being a fine particle of a urethane polymer, wherein said fine particle of urethane polymer contains molecules having as substituents organic groups which form ion pairs when neutralized with basic groups or acidic groups, and each polymer fine particle contains a colorant within the particle, wherein said polymer fine particles have an average particle diameter in the range of 5 to 700 nm, a maximum particle diameter of at most 1000 nm, and a particle size distribution, at m value of shape parameter according to the Weibull distribution, of at least 1.3, and wherein said polymer fine particles are insoluble in an organic solvent and have film-forming properties at room temperature.

2. Polymer fine particles for a jet ink according to claim 1 wherein said organic solvent is acetone.

3. Polymer fine particles for a jet ink according to claim 1, wherein each polymer fine particle possesses a crosslinked molecular structure.

4. Polymer fine particles for a jet ink according to claim 1, wherein each polymer fine particle is spherical.

5. Polymer fine particles for a jet ink according to claim 1, wherein said fine particle of urethane polymer is obtained by reacting a polyol (A) having as substituent an organic group which forms an ion pair when neutralized with an acidic group or a basic group, a polyisocyanate (B), and a polyamine (C).

6. A process for producing the polymer fine particles of claim 5 for a jet ink, comprising the steps of:
   preparing a mixture of polyol (A) having as substituent an organic group which forms an ion pair when neutralized with an acidic group or a basic group, and a colorant;
   preparing an organic phase by mixing said mixture and a polyisocyanate (B), in the presence of a non-reactive solvent; and
   preparing fine particles of a urethane polymer using said organic phase and a polyamine (C).

7. A process for producing polymer fine particles according to claim 6, wherein molecules of polyol (A) contain carboxyl groups.

8. A process for producing polymer fine particles according to claim 7, wherein said polyisocyanate (B) has the equivalent weight of at least 1.0 with respect to the sum total of the equivalent weight of hydroxyl groups in said polyol (A) containing a carboxyl group, and the equivalent weight of active hydrogens in said polyol (A) containing a carboxyl group and said polyamine (C).

9. A process for producing polymer fine particles according to claim 8, wherein said carboxyl group is neutralized with a base to form a salt.

10. A process for producing polymer fine particles according to claim 6, wherein said polyisocyanate (B) has the equivalent weight of at least 1.0 with respect to the sum total of the equivalent weight of hydroxyl groups in said polyol (A) and the equivalent weight of amino groups having active hydrogens in said polyamine (C).

11. Polymer fine particles for a jet ink according to claim 1, wherein said fine particle of urethane polymer contains a polyurethane polyurea structure.

12. A process for producing the polymer fine particles of claim 1 for a jet ink, comprising the steps of:
   preparing a mixture of polyol (A) having as substituent an organic group which forms an ion pair when neutralized with an acidic group or a basic group, and a colorant; and
   preparing fine particles of a urethane polymer using said mixture.

13. A jet ink comprising the polymer fine particles of claim 1.

14. Polymer fine particles for a jet ink, wherein said polymer fine particles have an average particle diameter in the range of 5 to 700 nm, a maximum particle diameter of at most 1000 nm, and a particle size distribution, at m value of shape parameter according to the Weibull distribution, of at least 1.3, and wherein said polymer fine particles are insoluble in an organic solvent and have film-forming properties at room temperature.

15. Polymer fine particles for a jet ink according to claim 14, wherein said polymer fine particles are colored polymer fine particles.

* * * * *